US010067902B2

(12) United States Patent
Alaniz et al.

(10) Patent No.: US 10,067,902 B2
(45) Date of Patent: Sep. 4, 2018

(54) SLOT BASED MANAGEMENT CONTROLLER ADDRESS (71) Applicant: HEWLETT PACKARD ENTERPRISE DEVELOPMENT LP, Houston, TX (US)

(72) Inventors: Leopoldo Alaniz, Spring, TX (US); Andrew Brown, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 288 days.

(21) Appl. No.: 14/915,894

(22) PCT Filed: Sep. 24, 2013

(86) PCT No.: PCT/US2013/061284
§ 371 (c)(1),
(2) Date: Mar. 1, 2016

(87) PCT Pub. No.: WO2015/047212
PCT Pub. Date: Apr. 2, 2015

(65) Prior Publication Data
US 2016/0196228 A1 Jul. 7, 2016

(51) Int. Cl.
G06F 13/00 (2006.01)
G06F 13/40 (2006.01)
G06F 13/10 (2006.01)
H04L 29/12 (2006.01)

(52) U.S. Cl.
CPC .......... *G06F 13/404* (2013.01); *G06F 13/102* (2013.01); *G06F 13/4022* (2013.01); *G06F 13/4068* (2013.01); *H04L 61/2007* (2013.01)

(58) Field of Classification Search
None
See application file for complete search history.

(56) References Cited

U.S. PATENT DOCUMENTS 8,082,391 B2 * 12/2011 Brown .................. G06F 3/0605
711/114
2006/0269720 A1 11/2006 Ballard
2009/0024724 A1 1/2009 Hirai
2009/0073820 A1 3/2009 McIntosh
(Continued)

FOREIGN PATENT DOCUMENTS

TW 200540633 A 12/2005
TW 201328246 A 7/2013

OTHER PUBLICATIONS

ETegro Technologies Inc. ; ETegro Hyperion RS530 G3 server user manual; http://www.etegro.com/service/articles/rs530g3 >; 2011.
(Continued)

Primary Examiner — Cheng-Yuan Tseng
(74) Attorney, Agent, or Firm — Hewlett Packard Enterprise Patent Department (57) ABSTRACT Techniques for determining an address of a management controller are provided. A microcontroller on a cartridge may read a signal from an enclosure, wherein the signal is associated with a slot in the enclosure. A network address for a first management controller associated with the cartridge may be determined based on the signal. The first management controller may be communicated with for cartridge management actions.

15 Claims, 5 Drawing Sheets (56) References Cited

U.S. PATENT DOCUMENTS

| | | |
|---|---|---|
| 2009/0310253 A1 | 12/2009 | Georgis |
| 2010/0080090 A1 | 4/2010 | Spivak |
| 2011/0153798 A1 | 6/2011 | Groenendaal et al. |
| 2011/0202685 A1 | 9/2011 | Subramaniam et al. |
| 2011/0285264 A1 | 11/2011 | Schmidtke |
| 2012/0116590 A1 | 5/2012 | Florez-Larrahondo et al. |

OTHER PUBLICATIONS

PCT/ISA/KR, International Search Report, dated Jun. 20, 2014, PCT/US2013/061284, 9 pps.

* cited by examiner

SLOT BASED MANAGEMENT CONTROLLER ADDRESS

BACKGROUND

Modern data centers may contain tens or hundreds of thousands of server computers. In addition to the complexities of managing the workloads processed by these servers, there is the complexity involved in managing the servers themselves. Modern servers may include an additional processor, often referred to as a baseboard management processor (BMC) to handle server management tasks. For example, the BMC may be able to power on/off the server. The BMC may be able to retrieve performance metrics from the server. The BMC may also be able to configure various operational parameters for the server. These types of tasks may be referred to as management actions, as they are directed to management operations on the server and are sent to the BMC.

DETAILED DESCRIPTION

Although a BMC is one solution for performing server management tasks, the solution is not without problems. For example, a BMC is a relatively powerful processor and as such is a source of excess cost on a server. Furthermore, in many cases, the processing capabilities of a BMC are not fully utilized by a server, and as such, processing cycles of the BMC may be wasted.

To overcome these problems, a system which removes the BMC from each individual server and aggregates the functionality on a lesser number of components may be provided. For example, the functionality provided by a BMC may be provided on a component which may be referred to as a management controller. The functionality of the management controller may be shared by several different servers. The management controller may be included within an enclosure housing the servers, or the management controller may be external to the enclosure. In some implementations, the management controller may even be external to a rack housing the enclosure. Techniques described herein are not dependent on the location of the management controller.

In one example implementation, an enclosure may contain a plurality of slots. A cartridge, which includes the functionality of a server, but does not include a BMC, may be inserted into one or more of the slots. Instead of a BMC, each cartridge may include a microcontroller, which allows the cartridge to communicate with a remote management controller, which provides the functionality of the BMC. The enclosure may also include a plurality of management controllers. Thus, the functionality of the BMC may be preserved without requiring a BMC to be included on each cartridge.

The cartridges, microcontrollers, and management controllers may all be connected to a fabric that allows all of the components to communicate with each other. Thus, if an enclosure has multiple management controllers, a mechanism is needed to inform the cartridge as to which management controller the cartridge should communicate. Although it may be possible to specify this information manually, such a solution is error prone and may not be capable of handling dynamic changes in management controller availability. The techniques described herein provide a mechanism for a cartridge to self identify its associated management controller as well as respond to changes in management controller assignment. These techniques are described in further detail below and in conjunction with the attached figures. Although the techniques are described in terms of cartridges containing compute components and microcontrollers, it should be understood that the techniques are applicable to any type of resource, not just compute resources. For example, there may also be switch or chassis resources that contain microcontrollers that may be able to communicate with a management controller.

Figure 1:
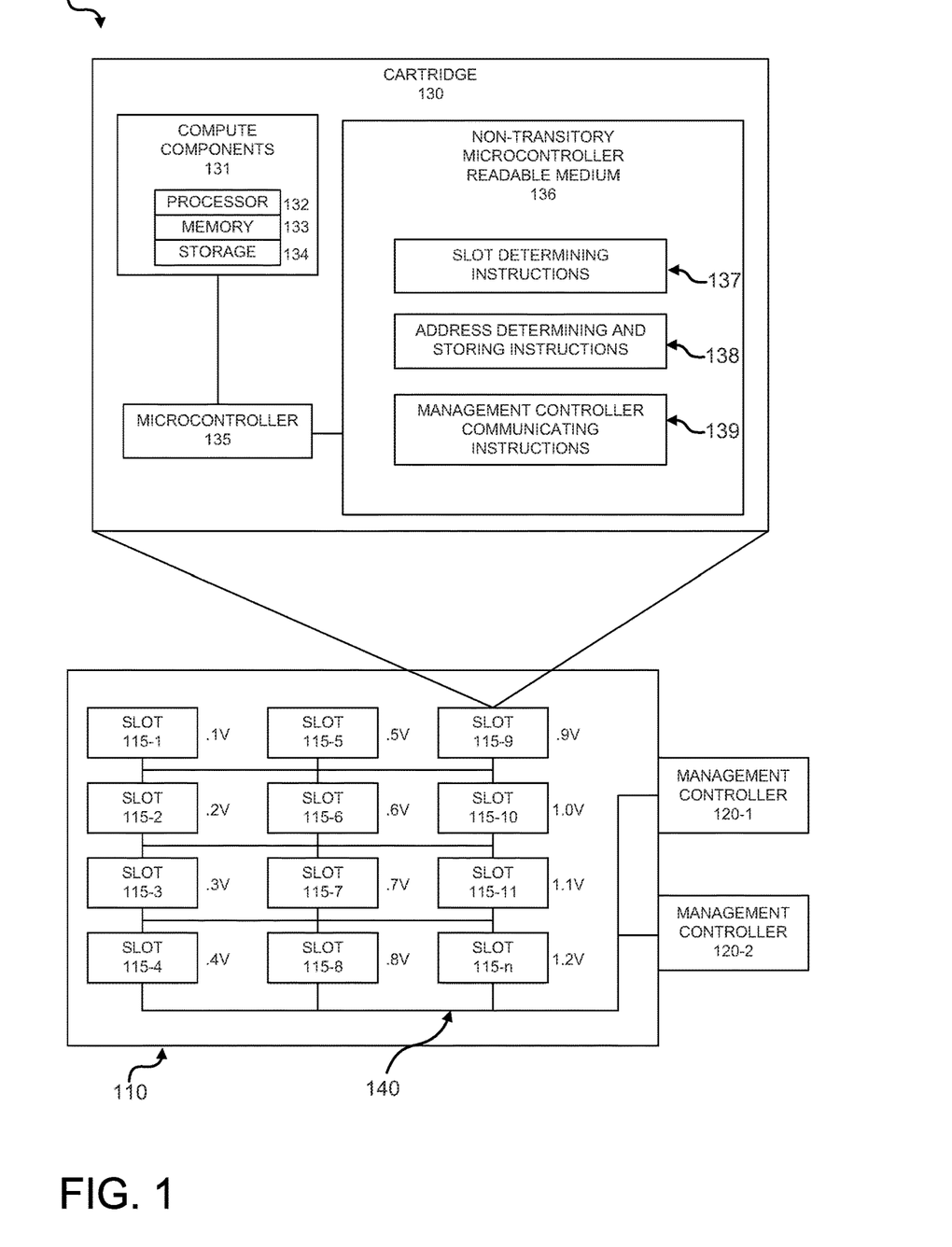
FIG. 1 is an example of a system in which cartridges in an enclosure determine an address of an associated management controller, in accordance with the techniques described herein.

FIG. 1 is an example of a system in which cartridges in an enclosure determine an address of an associated management controller, in accordance with the techniques described herein. System 100 may include an enclosure 110. Enclosure 110 may include a plurality of slots 115-1 ... n. Each slot may accept a cartridge, an example of which is cartridge 140. The enclosure may also include one or more management controllers 120-1,2.

The enclosure 110 acts as a housing for the cartridges. The enclosure may provide facilities that may be used by all of the cartridges installed in the enclosure. For example, the enclosure may provide each slot 115 with a connection to a power source (not shown). A cartridge plugged into the slot may then obtain power from the power source. The enclosure may also provide additional resources, such as cooling resources. A cartridge inserted into a slot may be cooled by fans (not shown) contained in the enclosure. Although twelve slots are shown in FIG. 1, it should be understood that this is only for purposes of ease of description. An enclosure may have any number of slots. For example, in one example implementation and enclosure may have 45 slots.

Each slot 115-1 ... n in the enclosure 110 may be associated with a signal, which may be read by a cartridge inserted in the slot. In one example embodiment, each slot may be associated with an analog signal such as an analog voltage. As shown in FIG. 1, each slot is associated with an analog voltage, in 0.1 volt increments. It should be understood that the example presented is simply that, an example. Any type of signal that may be associated with a slot may also be used. The use of such a signal is described in further detail below, however it should be understood that the signal may be read by the cartridge.

The enclosure may also include one or more management controllers 120-1,2. Although only two management controllers are shown, it should be understood that this is for purposes of ease of explanation and should not be considered limiting. Any number of management controllers has been contemplated. As mentioned above, the management controller provides functionality similar to that provided by a baseboard management controller (BMC). However, the management controller may provide BMC functionality for multiple compute nodes, instead of a single compute node.

The enclosure 110 may also include an interconnection fabric 140 that may connect the slots 115, and by extension the cartridges inserted into the slots, to the management controllers 120. In one example implementation, the fabric 130 may be an Ethernet fabric and each cartridge and management controller is assigned an Internet Protocol (IP) address. Communications between the cartridges and the management controllers may occur over the fabric, with the IP address used for addressing. Assignment of IP addresses is described in further detail below.

Cartridge 130 is an example of an implementation of a compute cartridge. The cartridge may contain compute components 131, a microcontroller 135, and non-transitory micro-controller readable medium 136. The compute components may include components that are found in many server computers. For example, the compute components may include a processor 132 to process instructions, a memory 133 to provide temporary storage, and a storage 134 to provide persistent storage. In short, the compute components 131 may provide the functionality to execute the workloads assigned to the cartridge, whatever those workloads may be.

The cartridge may also include a microcontroller 135. The microcontroller 135 may be coupled to the compute components. As mentioned above, many servers include a BMC, which is a relatively expensive component. The BMC may be used to perform management operations on the compute components of a server. Techniques provided herein offload the processing done by a BMC to one of the management controllers 120 described above. The microcontroller 135 may be used to provide an interface between the cartridge and one of the management controllers.

The microcontroller 135 may also be coupled to a non-transitory microcontroller readable medium 136. The medium may contain thereon instructions, which when executed by the microcontroller cause the microcontroller to implement the techniques described herein. For example, the medium may include slot determining instructions 137, which may allow the cartridge to determine which slot in the enclosure it is installed in. The medium may also include address determining and storing instructions 138, which may allow the cartridge to determine and store proper IP addressing information. The medium may also include management controller communicating instructions 139, which may allow the cartridge to communicate with the management controllers. The operation of these components is described in further detail below.

In operation, each of the management controllers may have an IP address assigned. In some implementations, the management controllers IP addresses may be assigned by a user, or the IP addresses may be assigned in a fixed relationship. For example, the first management controller in an enclosure may have a pre-defined IP address such as 10.0.0.1, while the second one has an address of 10.0.0.2.

A cartridge may be inserted into one of the slots. For example, cartridge 130 may be inserted into slot 115-9. Upon insertion, the cartridge may begin to receive power from the slot, and begin the process of booting. As part of the boot process, the microcontroller 135, using the slot determining instructions 137 of cartridge 130 may read the signal provided by the slot 115-9. In the example shown, the signal associated with slot 115-9 is 0.9 volts. The cartridge may then use the slot determining instructions to process this signal to determine into which slot in the enclosure the cartridge is inserted.

In the example shown in FIG. 1, the signal to slot conversion is shown using a simplistic algorithm, in that the voltage of the signal at the slot is directly related to the slot number. In the example shown, 0.9 volts is associated with slot 9. However, it should be understood that this is for purposes of ease of description only. Any mechanism by which a signal associated with a slot may be used by the cartridge in order for the cartridge to identify in which slot it is installed may also be used with the techniques described herein.

Once the cartridge knows into which slot it is installed, the cartridge may determine several IP addresses for purposes of communications. For example, the cartridge itself may assign itself an IP address based on the slot it is installed in. For example, the cartridge may maintain a table that associates slot numbers with IP addresses. Once the slot number is determined, the cartridge may be able to determine its own IP address. Thus, the cartridge does not need to be manually configured with an IP address. If the cartridge is moved to a different slot, the cartridge may automatically assume the IP address associated with that slot. The cartridge may then store its own determined IP address.

In addition, the cartridge may, using the address determining and storing instructions 138, determine the management controller that is to initially manage the cartridge. As explained above, there may be a plurality of slots and a plurality of management controllers. The cartridge may need to determine to which management controller the cartridge should initially communicate. In order to make this determination, once the slot is determined, the cartridge may determine the associated management controller IP address. For example, the cartridge may maintain a data that associates slots 1-6 with the first management controller, while slots 7-n are associated with the second management controller. Thus, once the cartridge has determined which slot it is installed in, it may also be able to determine to which management controller it should communicate. The IP address of the determined management controller may be stored.

As the system operates, the cartridge 130, through the microcontroller 135, may communicate with the management controller 120. The cartridge may include management controller communicating instructions 139 which cause the microcontroller to send all communications destined to the management controller to the IP address that was stored above. However, in some cases, it may be necessary to move management functions for a cartridge from one management controller to a different management controller. For example, if the current management controller fails, or is to be taken out of service for some reason, it may be desirable to transfer management functions to a different management controller.

To accomplish this, the management controller communicating instructions may, upon receipt of a management packet from any management controller, store the IP address of the source of that packet as the determined management controller IP address. Any further communications would then be sent to that IP address. In other words, a cartridge may initially determine the IP address of its associated management controller based on the slot in which the cartridge is installed. This IP address is stored as the management controller IP address, and may be used for all management controller communications. Upon receipt of any packet from any management controller, the stored IP address may be overwritten with the IP address of the source of the management packet. If there has been no change of management controller, the IP address will be the same as that which was stored. However, if the management controller has changed, a different IP address may be stored. Because the cartridge uses the stored IP address for all management controller communications, a switch in management controllers may be transparent to the cartridge. In some implementations, a management controller may be able to send an explicit message to the microcontroller informing the microcontroller to overwrite the stored management controller IP address. However, regardless of implementation, the cartridge is able to determine the proper management controller to communicate with based on the store management controller IP address.

Figure 2:
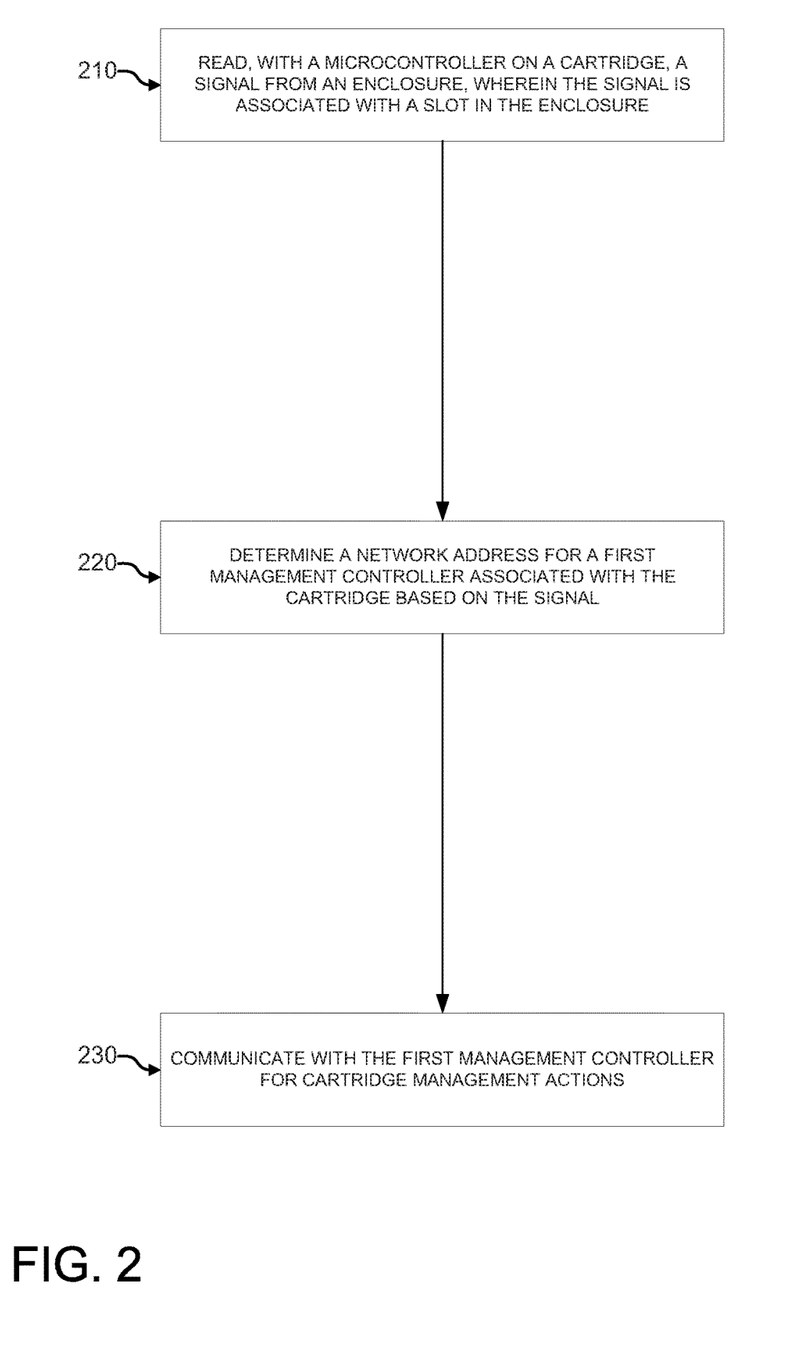
FIG. 2 is an example of a flow diagram for determining a network address of a management controller, according to techniques described herein.

FIG. 2 is an example of a flow diagram for determining a network address of a management controller, according to techniques described herein. In block 210, a microcontroller on a cartridge may read a signal from an enclosure, wherein the signal is associated with a slot in the enclosure. As described above, each slot in the enclosure may have an associated signal, such as an analog voltage. A microcontroller on a cartridge may read the value of the signal, and based on that value may determine which slot in the enclosure the cartridge is installed in.

In block 220, a network address for a first management controller associated with the cartridge may be determined based on the signal. As described above, an enclosure may have multiple management controllers. Each cartridge in the enclosure may communicate with one of the management controllers for cartridge management purposes. The signal, which identifies the slot in which the cartridge ins installed may be used to identify which management controller is to be used initially by the cartridge. In block 230, the cartridge may communicate with the first management controller for cartridge management actions.

Figure 3:
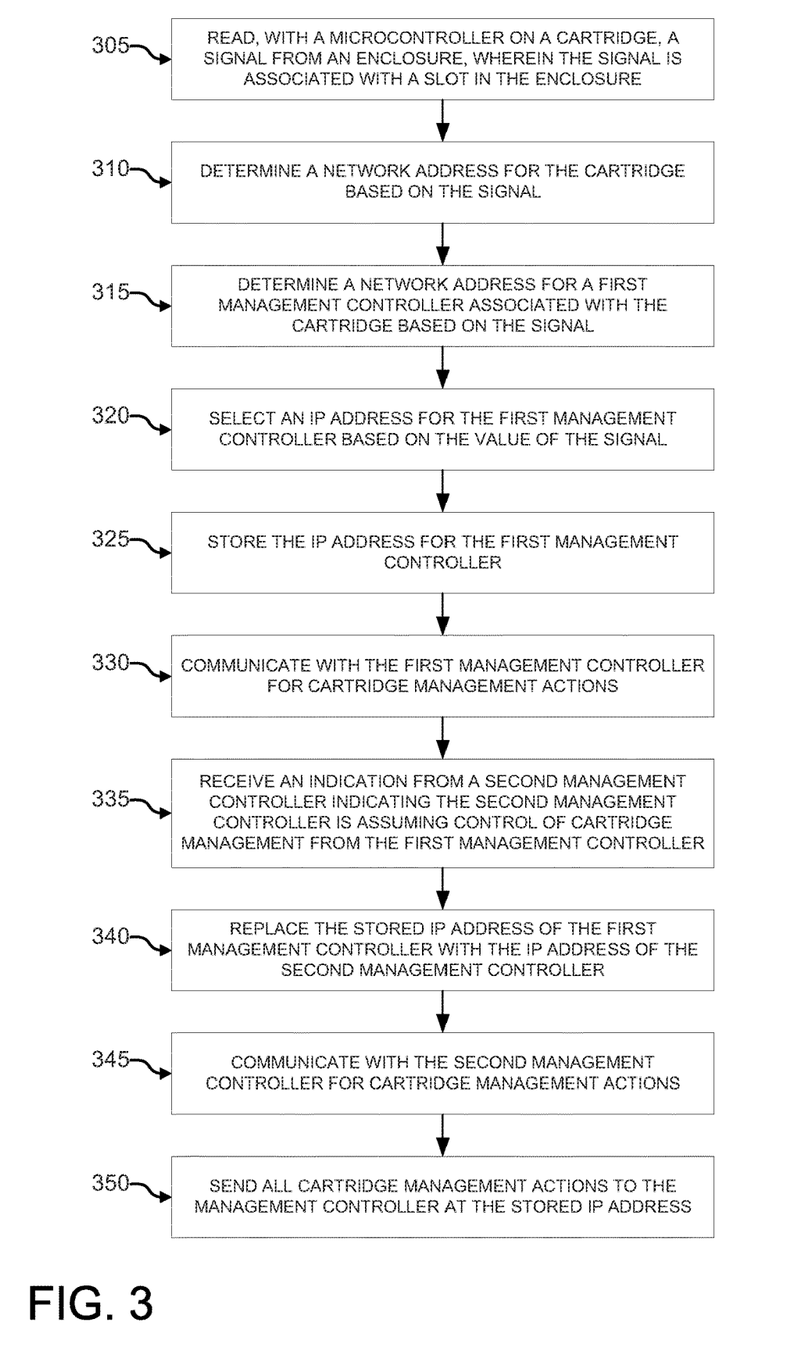
FIG. 3 is an example of a flow diagram for determining a network address of a management controller, and then switching to a different management controller according to techniques described herein.

FIG. 3 is an example of a flow diagram for determining a network address of a management controller, and then switching to a different management controller according to techniques described herein. In block 305, as described above, a microcontroller on a cartridge may read a signal from an enclosure, wherein the signal is associated with a slot in the enclosure. In block 310, a network address for the cartridge may be determined based on the signal. As described with respect to FIG. 1, each cartridge in the enclosure may have an address, such as an IP address, that is used for communications on the network in the enclosure. The IP address assigned to the cartridge may be associated with the slot the cartridge is installed in. Thus, it is not necessary to pre-configure the cartridge with a network address.

In block 315, as above, a network address for a first management controller associated with the cartridge based on the signal may be determined. In other words, the signal may determine which slot in the enclosure the cartridge is installed in, and this in turn determines the management controller that the cartridge should use initially. In block 320, an IP address for the first management controller may be selected based on the signal. For example, the signal may indicate which slot the cartridge is installed in, and there may be a table associating management controller IP addresses to slot numbers.

In block 325, the IP address of the first management controller may be stored. It should be understood that what is being stored is the IP address of the management controller that is selected to manage the specific cartridge being configured. As will be described in further detail below, overwriting the stored IP address may cause the cartridge to communicate with a different management controller. In block 330 the cartridge may communicate with the first management controller for cartridge management actions. What should be understood is that the cartridge will communicate with whichever management controller has its IP address stored.

In block 335, an indication may be received from a second management controller indicating that the second management controller is assuming control of cartridge management from the first management controller. In some implementations, the indication may be an explicit communication to the cartridge, informing the cartridge of a change in management controller. This communication may include the IP address of the new management controller. In other implementations, the cartridge may monitor the IP address of all packets coming from a management controller. If a new management controller is to take over for the first management controller, the IP address will be different. Thus, the cartridge is made aware that the management controller has changed.

In block 340, the stored IP address of the first management controller may be replaced with the IP address of the second management controller. In other words, the cartridge stores the IP address of the management controller that is currently assigned to manage the cartridge. In block 345, the cartridge may communicate with the second management controller for cartridge management actions. In block 350, the cartridge may send all cartridge management actions to the management controller at the stored IP address. In other words, the cartridge uses the management controller at the IP address that was stored. This address may have been initially determined by the slot in the enclosure that contained the cartridge. However, the IP address may also be change by a communication from a new management controller. The cartridge simply uses the stored IP address, which ensures that management communications go to the currently assigned management controller.

Figure 4:
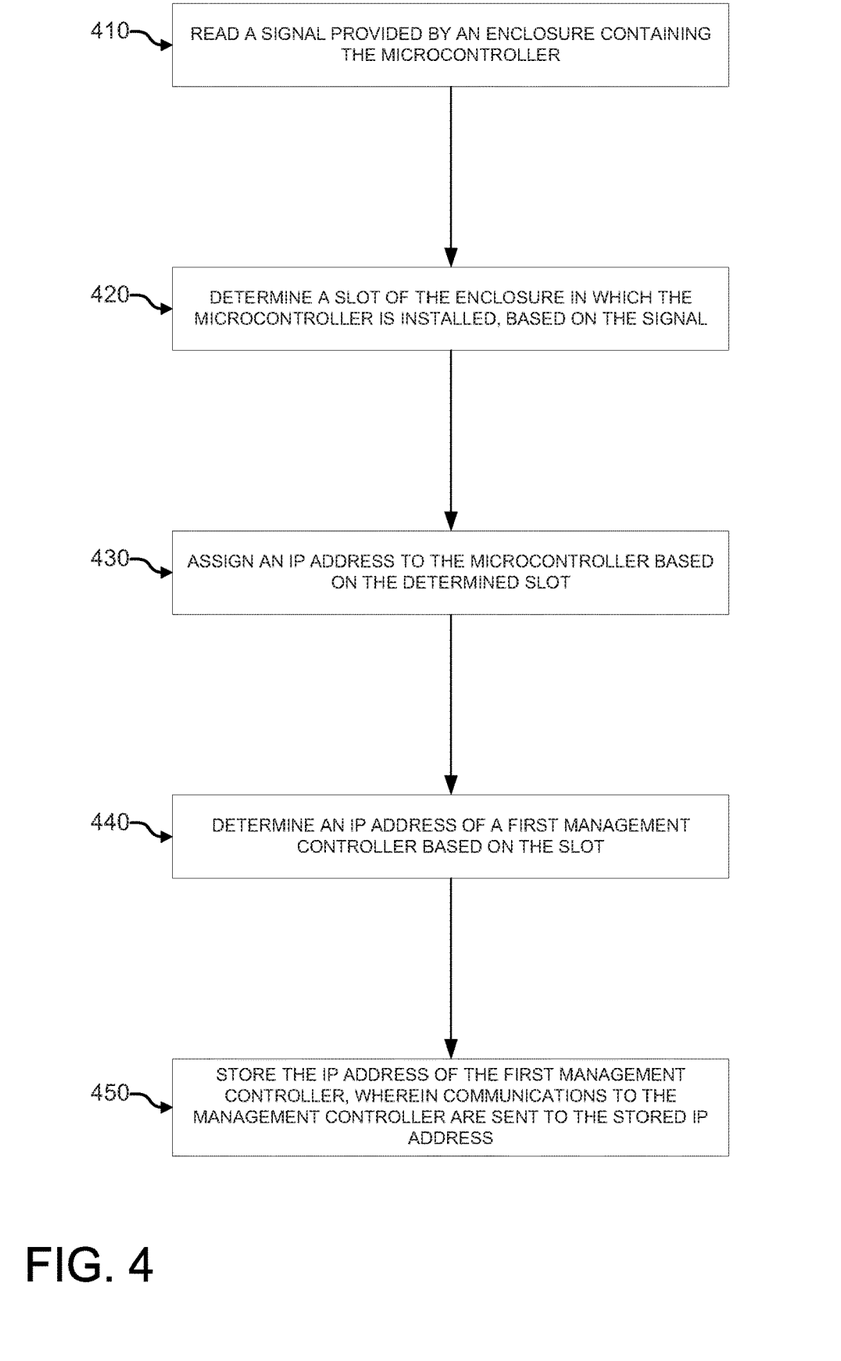
FIG. 4 is an example of a flow diagram for determining an IP address of a cartridge and its associated management controller, according to techniques described herein.

FIG. 4 is an example of a flow diagram for determining an IP address of a cartridge and its associated management controller, according to techniques described herein. In block 410, a microcontroller may read a signal provided by an enclosure containing the microcontroller. As described above, each cartridge may include a microcontroller to perform management actions. The microcontroller may read a signal provided by the enclosure. In block 420, a slot of the enclosure in which the micro controller is installed may be determined based on the signal. In other words, each slot of the enclosure may be associated with a different signal. As mentioned above, that signal may be an analog value, such as a voltage.

In block 430, an IP address may be assigned to the microcontroller based on the determined slot. Thus, the microcontroller need not be pre-configured with an IP address, but rather the IP address can be obtained by determining which slot the microcontroller is installed in. If the cartridge containing the microcontroller is moved to a different slot, a new IP address will be assigned, based on the signal associated with the new slot.

In block 440, an IP address of a first management controller may be determined based on the slot. For example, each slot may be associated with one of the available microcontrollers in a pre-determined fashion. Once it is determined in which slot the cartridge containing the microcontroller is installed, the associated management controller is known. In block 450, the IP address of the first management controller may be stored, wherein communications to the management controller are sent to the stored IP address. Thus, the microcontroller initially determines the IP address of the associated management controller based on the slot the microcontroller is installed in. This IP address is then stored. Future communications with the management controller are sent to the stored IP address. If a change in the management controller is needed, the stored IP address may be changed.

Figure 5:
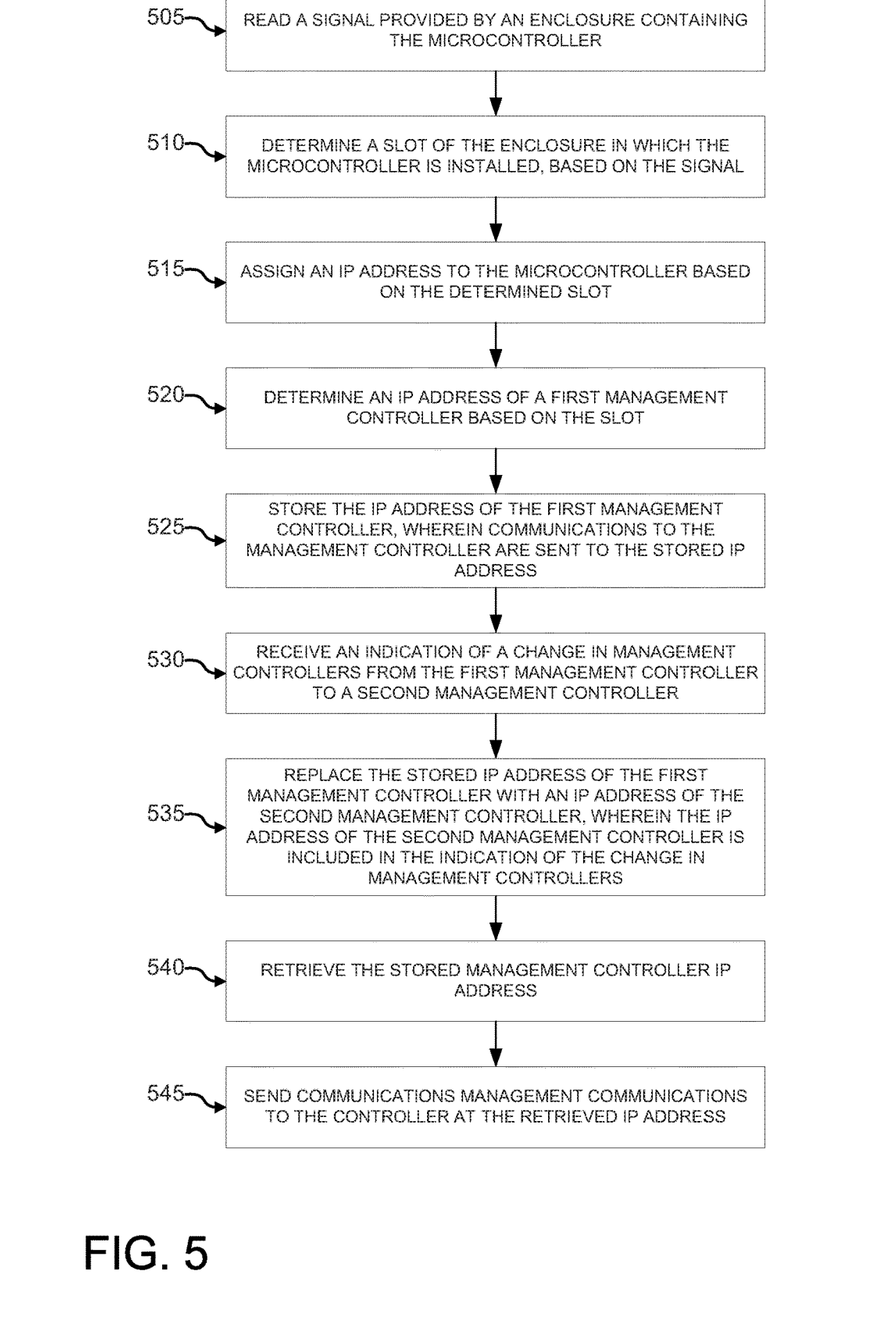
FIG. 5 is an example of a flow diagram for determining an IP address of a cartridge and its associated management controller, and then switching management controllers, according to techniques described herein.

FIG. 5 is an example of a flow diagram for determining an IP address of a cartridge and its associated management controller, and then switching management controllers, according to techniques described herein. In block 505, as above, a signal provided by an enclosure containing the microcontroller may be read. In block 510, the slot in the enclosure in which the microcontroller is installed may be determined. In block 515, an IP address may be assigned to the microcontroller based on the determined slot. In block 520, an IP address of a first management controller may be determined based on the slot. In block 525 the IP address for the first management controller may be stored, wherein communications to the management controller are sent to the stored IP address.

In block 530, an indication of a change in management controllers from a first management controller to a second management controller may be received. For any number of reasons, the management controller initially determined to support the cartridge may need to be changed. An indication of such a change may be received by the microcontroller.

In block 535, the stored IP address of the first management controller may be replaced with an IP address of the second management controller, wherein the IP address of the second management controller is included in the indication of the change in the management controller. In some implementations, the indication may be an explicit message received by the microcontroller, indicating the change of management controllers and identifying, by IP address, the new management controller. In other implementations, the microcontroller may independently determine a change in management controllers. For example, if a management action is received from a management controller, and the IP address of the sender of the management action is different than the stored IP address, then the microcontroller may be made aware that the management controller has changed. The microcontroller may then replace the stored IP address with the newly received IP address.

In block 540, the stored management controller IP address may be retrieved. In block 545, communications from the microcontroller to the management controller may be sent to the management controller at the retrieved IP address. In other words, the initial IP address for the management controller may be determined based on the slot in which the cartridge containing the microcontroller is installed, however the stored IP address may be what is used on an ongoing basis to identify the current management controller that is responsible for the microcontroller on a given cartridge.

We claim:

1. A method for a cartridge to communicate with a first management controller, the method comprising:
    reading, via a microcontroller on the cartridge and excluding the use of a baseboard management controller, an analog signal from an enclosure, wherein the analog signal is associated with a slot in the enclosure into which the cartridge is inserted;
    determining an Internet Protocol network address, via the microcontroller communicating with a non-transitory readable medium of the cartridge, of the first management controller associated with the cartridge based on the analog signal;
    storing the Internet Protocol network address of the first management controller on a storage of the cartridge; and
    communicating with the first management controller for cartridge management actions.

2. The method of claim 1 further comprising:
    determining a network address for the cartridge based on the analog signal.

3. The method of claim 1, wherein the analog signal is an analog voltage.

4. The method of claim 1 further comprising:
    receiving an indication from a second management controller indicating the second management controller is assuming control of cartridge management from the first management controller; and
    communicating with the second management controller for cartridge management actions.

5. The method of claim 4 wherein determining the network address for the first management controller further comprises:
    selecting the Internet Protocol address for the first management controller based on the value of the signal;
    storing the Internet Protocol address for the first management controller; and
    sending all cartridge management actions to the management controller at the stored Internet Protocol address.

6. The method of claim 5 wherein receiving an indication from a second management controller indicating the second management controller is assuming control of cartridge management from the first management controller further comprises:
    replacing the stored Internet Protocol address of the first management controller with the Internet Protocol address of the second management controller.

7. The method of claim 6, wherein the Internet Protocol address of the second management controller is included in the indication from the second management controller indicating the second management controller is assuming control of cartridge management from the first management controller.

8. A non-transitory microcontroller readable medium containing a set of instructions thereon, which when executed by the microcontroller cause the microcontroller to:
    read an analog signal, excluding the use of a baseboard management controller, provided by an enclosure containing the microcontroller;
    determine a slot of the enclosure in which the microcontroller is installed, based on the analog signal;
    assign an Internet Protocol address to the microcontroller based on the determined slot;
    determine an Internet Protocol address of a first management controller based on the slot; and
    store the Internet Protocol address of the first management controller, wherein communications to the management controller are sent to the stored Internet Protocol address.

9. The medium of claim 8 further comprising instructions to:
    receive an indication of a change in management controllers from the first management controller to a second management controller; and
    replace the stored Internet Protocol address of the first management controller with an Internet Protocol address of the second management controller, wherein the Internet Protocol address of the second management controller is included in the indication of the change in management controllers.

10. The medium of claim 9 further comprising instructions to:
retrieve the stored management controller Internet Protocol address; and
send communications management communications to the controller at the retrieved Internet Protocol address.

11. The medium of claim 9 wherein the indication of the change in management controllers is receipt of a management packet including an Internet Protocol address that is different from the stored Internet Protocol address.

12. A cartridge comprising:
a central processing unit;
a microcontroller to communicate, excluding the use of a baseboard management controller, with a first management controller using the first management controller Internet Protocol address, the microcontroller to determine the slot within an enclosure housing the cartridge based on an analog signal read from the enclosure, wherein the Internet Protocol address of the management controller is based on the determined slot and stored on a storage of the cartridge.

13. The cartridge of claim 12 wherein the value of the signal determines the slot.

14. The cartridge of claim 12 further comprising:
the microcontroller to receive a management communication from a second management controller; and
the microcontroller to send new management communications to the second management controller.

15. The cartridge of claim 14 wherein the Internet Protocol address included in the management communication identifies the current management controller for the cartridge.

* * * * *